United States Patent [19]

Völker et al.

[11] 4,188,309

[45] Feb. 12, 1980

[54] SHAPED CATALYST AND PROCESS FOR ITS PRODUCTION

[75] Inventors: Herbert Völker, Hanau; Edgar Koberstein, Alzenau; Alfred Bozon, Erlensee; Jörg Hensel, Hanau, all of Fed. Rep. of Germany

[73] Assignee: Deutsche Gold- und Silber-Scheideanstalt vormals Roessler, Frankfurt am Main, Fed. Rep. of Germany

[21] Appl. No.: 913,461

[22] Filed: Jun. 7, 1978

[30] Foreign Application Priority Data

Oct. 7, 1977 [DE] Fed. Rep. of Germany ....... 2745188

[51] Int. Cl.² .................... B01J 21/04; B01J 23/78; B01J 23/84; B01J 21/12
[52] U.S. Cl. .................... 252/466 J; 252/432; 252/443; 252/455 R; 252/462; 252/464; 252/465; 252/466 B; 252/477 R; 423/213.5
[58] Field of Search ............ 252/466 B, 466 J, 477 R, 252/432, 443, 455 R, 462, 464, 465; 423/213.5

[56] References Cited

U.S. PATENT DOCUMENTS

| | | | |
|---|---|---|---|
| 3,873,472 | 3/1975 | Oshima et al. | 252/466 B |
| 3,920,583 | 11/1975 | Pugh | 252/466 PT |
| 3,957,692 | 5/1976 | Cairns et al. | 252/466 B |

*Primary Examiner*—W. J. Shine
*Attorney, Agent, or Firm*—Beveridge, DeGrandi, Kline & Lunsford

[57] ABSTRACT

There are provided shaped catalysts, particularly for the formation and/or equipping of reaction chambers with catalytically active surfaces, consisting of a structural reinforcing agent of ferrous metal, a layer of a heat resistant carrier material on the structural reinforcing agent as well as a catalytically active component on the carrier material; the body of the structural reinforcing agent consists of iron or steel and its surface is provided with a nonscaling, adhesive and anchoring enhancing aluminum/iron diffusion layer obtained by a tempering of aluminum coated iron or steel at a temperature between 600° and 1200° C. for at least one minute. There is also disclosed a process for making the catalysts.

51 Claims, 4 Drawing Figures

SHAPED CATALYST AND PROCESS FOR ITS PRODUCTION

BACKGROUND OF THE INVENTION

The invention is directed to a shaped catalyst, particularly for the formation and/or equipping of reaction chambers with catalytically active surfaces, a process for the production of these catalysts, especially in directly insertable spatial conformations as well as their use for purifying waste gas.

The noxious materials of waste gas, particularly exhaust gases of internal combustion motors of the continuously increasing number of motor vehicles, presents a considerable danger to the health of men, animals and the plant world. In several countries, they are presently limited through laws regulating the maximal permissible toxic material concentrations. Among the already proposed and practiced methods for the solution of these air pollution problems the catalytic waste gas purification processes are the most important. In regard to behavior in heating, effectiveness, duration of activity and mechanical stability the highest demands are placed on the needed catalysts. For example, when inserted in motor vehicles they must be effective at the lowest possible temperatures and guarantee for a long time in all important temperature and space velocity ranges a high percentage reaction of the noxious materials to be removed (particularly hydrocarbons, carbon monoxide and nitric oxide) to the non-toxic oxidation and reduction products carbon dioxide, steam and nitrogen. Because of the severe mechanical load during the continued operation they must have sufficient mechanical stability and must not lose this even with long overheating as can occur in a given case through impact with unburned motor fuel caused by, for example, ignition failure in one or more cylinders. Thus they must satisfy a number of conditions which simultaneously are difficult to fulfill or are contrary to each other.

Previously besides particulate bed catalysts, i.e., pellets or extrudates of supported catalysts or interspersant or mixed catalysts, there have been primarily used monolithic supported catalysts. They consist of a catalytically inert, low surface area ceramic skeleton of, e.g., cordierite, mullite or α-aluminum oxide as structural reinforcing support on which there is placed a thin, for the most part high surface area, layer of a heat resistant, for the most part oxidic carrier material such as aluminum oxide of the so-called gamma form, which latter in turn supports the true catalytically active components.

These can consist of noble metal, noble metal compounds or non-noble metal compounds or mixtures thereof. From the group of noble metals there are added, for example, platinum, palladium, rhodium, ruthenium, iridium, gold and silver. As non-noble metal compounds there can be used, for example, the oxides of copper, chromium, manganese, iron, cobalt, nickel and their combinations, as, for example, copper chromite. Further variants arise by combining noble metals or their compounds with non-noble metals or their compounds or non-noble metals or their compounds with noble metals or their compounds. In many cases there are added to the active components slight amounts of other elements, for example, from the group of alkaline earth metals such as magnesium, calcium, strontium or barium, from the group of rare earths such as, e.g., samarium, lanthanum, cerium or from the fourth group of the periodic system, as, e.g., titanium, zirconium or tin, as so-called promoters for improving specific properties of the system. Intermetallic compounds and alloys of the above metals and compounds may also be used.

An important disadvantage of catalysts made using ceramic structural reinforcing supports, particularly of monolithic honeycomb catalysts of cordierite, mullite or α-aluminum has proven to be their sensitivity toward mechanical influences and thermal overheating. Thus the vibrations occurring in operation of the unit through the intermittent impulses of the exhaust gas column, the motor vibrations and travelling motion in combination with temperature peaks exert wear and fracture causing forces on the ceramic. With thermal overheating taking place within the narrow spatial confines of the monoliths there can occur sintering, melting and baking of the structurally reinforcing agents with their coatings present in the form of monoliths or pellets, from which partial or complete inactivation results.

Furthermore, it has been shown that the installation of such ceramic honeycombs in metal housings is difficult because of the different heat expansion characteristics of ceramic and metal and requires expensive construction precautions in order to guarantee with the relative motion occurring elastic and gas tight support of the honeycomb continuously in the highest possible interval in the temperature range between −30° and +1000° C.

There has not been a lack of endeavors to replace the ceramic based materials by better suited synthetic materials and to attempt to seek a favorable spatial design for this.

Thus there has already been described in German O.S. No. 2,302,746 a carrier matrix for a catalytic reactor for waste gas purification of internal combustion engines which is manufactured from a variably arranged corrugated and smooth high temperature resistant steel sheet, which is coated with a catalytically acting metal, such a platinum or palladium, or a metal oxide, such as copper oxide, nickel oxide or the like. There is also described, to insert metal carriers of materials having a high nickel content (Monel metal) whereby the nickel after conversion into the oxide show catalytic activity. The foregoing Offenlegungsschrift (published patent application) among others proposes either to coat the steel sheets with copper or nickel and to subsequently oxidize the coating or to directly coat it with a catalytically active metal oxide.

The German published patent applications Nos. 2,436,559 and 2,540,882 suggest both a simplified catalytic reactor for detoxification of the exhaust gases of an internal combustion engine in which the exhaust pipe and/or the manifold line and/or the discharge pipe optionally provided with gas agitating devices are coated internally with a catalytically active layer of platinum, copper or are wash coated with a gamma aluminum oxide which itself is coated with platinum.

All of the previously mentioned solutions, of course, produce a usable constructive solution for the spatial development of structural reinforcing agents to which the structural parts of the exhaust gas lines also belong. However, they do not show any way for the production of a sufficiently adhesive union between metal and catalyst carrier.

The first attempt for a treatment of this decisive problem for catalyst stability is found in German O.S. No. 2,450,664. There is described a catalyst constructed of maximally four layers, in which a heat and oxidation resistant carrier of an iron alloy in the form of an expanded sheet wound into a roll is covered with an oxygen containing, porous coating which should receive the catalyst layer arranged thereon and preferably is preserved by the thermal, chemical or electrolytical surface oxidation of an aluminum containing iron alloy with eventual additional reinforcement by means of an externally applied aluminum oxide (a likewise described alternative procedure consisting in the direct coating of the metal with aluminum oxide from dispersions is irrelevant to the problem addressed and because of the previously mentioned reasons is also unusable).

The disadvantages of such type of oxide-coated catalysts are seen in that they require expensive heat and oxidation resistant iron alloys for the structural reinforcing agent and the oxide layer only is sufficiently adhesive to the alloy, for example, against a wash coat to be applied, if the metal present in the iron alloy for oxide formation is contained in a concentration which is not too small and can be oxidized out of this to a sufficient extent and with formulation of a porous, mechanically stable surface texture in a sufficiently economically time. As a further drawback of the known catalyst there must be mentioned the fact that its metallic structural reinforcer because of the additional oxide layer attached to it lead to reduced values for the heat transfer from the catalyst material impacted with exhaust gas which can lead to temporary overheating of the catalyst material.

A satisfactory solution for the adhesive anchoring of catalysts to temperature resistant metallic supports consists in the flame spraying method and is described in German Pat. No. 2,151,416. It is also already proposed there to coat any shaped construction surface in the reaction chamber for catalytic reaction of gases with catalyst material. However, the disadvantage is that only special oxidation catalysts, the so-called mixed catalysts, or interspersant type catalysts are usable and an additional application of copper or silver metal is necessary as an adhesive primer.

SUMMARY OF THE INVENTION

The invention is based on the problem of overcoming these disadvantages and to provide a shaped catalyst, particularly for the formation and/or providing of reaction chambers with catalytically active surfaces, consisting of a structural reinforcing agent or support of ferrous metal, a layer of a heat resistant carrier material applied on the structural reinforcing agent as well as a catalytically active component on the carrier material, characterized by the body of the structural reinforcing agent consisting of iron or steel and its surface being provided with a nonscaling, adhesive and anchoring enhancing aluminum/iron diffusion layer obtained by a tempering of aluminum coated iron or steel at a temperature between 600° C. and 1200° C. for at least one minute.

The invention thus is directed to a composite catalyst produced from a very economical, catalytically inert body of carbon steel, cast or wrought iron or another low alloyed steel which because of the above described specified type of production is protected against corrosion and has a firmly adhering surface layer which has an alloy character and therewith high thermal conductivity, in accordance with radiographic (X-ray) analysis contains no aluminum oxide and because of its extraordinarily strong marked cleavage and random crystal matting is a preferred base for adhesion for the catalyst carrier system, consisting of an oxidic carrier material preferably applied as a wash coat and a catalytically active component deposited thereon.

However, there should not be overlooked the possibility included within the invention of inserting the much less expensive simple types of iron and steel in place of expensive alloyed steels with catalysts having metallic structural reinforcers, since this leads to reduction in cost by a factor of 5 to 10.

The use of aluminum/iron diffusion layers for the protection of iron objects, of course, has been known for a long time; however, it requires the temperature conditions demanded by the invention in order to attain a usable surface condition as a structural reinforcer for catalyst carrier based on iron or steel since here the corrosion property is only one of several possible promises for success.

It has also proven advantageous if the body of the structural reinforcer is made of a steel or cast iron with a carbon content between 0.005 and 5, preferably between 0.08 and 0.5 weight percent. With the stated temperature conditions, the body of the structural reinforcer receives an iron rich aluminum/iron-diffusion layer (alloy) with favorable ductility; aluminum rich diffusion layers, e.g., applied by calorization, which contain the brittle phase $Al_3Fe$, are more unfavorable.

The diffusion layer has a roughness which is above $0.05\mu$ measured by the Hommel apparatus $T_3$ for measuring the depth of roughness.

The shaped catalyst according to the invention can be so formed that the body of the structural reinforcer is coated entirely or partially or on one, several, or all sides thereof with the combination of carrier material and catalytically active components. There can be employed for the catalyst simple spatial forms such as pellets or another form suitable for a particulate bed. It can be formed as a honeycomb whereby at least the honeycomb channels are coated with the combination of carrier material and catalytically active components. It is sufficient for this to adhere to each other aluminum coated, wavy or alternatively wavy and smooth sheets producing individual, separated from each other, parallel flowing channels, for which purpose a simple tempering treatment is sufficient.

A substantial and industrially significant form of the shaped catalyst of the invention is that it is formed surrounding a reaction zone, whereby the catalytically active surface is oriented towards the reaction zone. This principle is already known from our German Pat. No. 2,151,416. Accordingly, the catalyst structure with the combination of carrier material and catalytically active component containing surface can bound the combustion chamber and exhaust gas channel of an internal combustion engine. For this purpose, for example, the cylinder head of an internal combustion engine is made of a structural reinforcer made of cast iron provided with the mentioned diffusion layer and the surface on the fuel chamber side provided with the catalyst carrier. The shaped catalyst, however, can also be built as a pipe or pipe system whose inner walls are coated with the combination of carrier material and catalytically active components. In a special form of the invention such a pipe or pipe system is built as an exhaust pipe, waste pipe or exhaust manifold line, preliminary or main muffler of a motor vehicle equipped with an internal combustion engine.

Finally, the shaped catalyst can be present in the form of suitable flow disturbing and/or direction changing bodies coated on all sides with the combination of carrier material and catalytically active components in the catalyst pipe or pipe system. The built-in bodies can be arranged continuously or intermittently with intermediate spaces in the pipe or pipe system. In the simplest case, the form consists of an exhaust pipe coated internally with catalyst carrier, which likewise is provided with catalyst overcoated, flow disturbing and/or flow direction changing formed installations with which there is provided an increased pressure head of about 0.3–2,500 mm of water measured at an air flow velocity at room temperature of 12 meters/second compared to an installation free pipe. This essential condition for the production of an optimal material exchange is treated in the German patent application P 26 58 892 of the inventors.

Catalyst pipes or pipe systems built according to the invention equipped with devices for inducing specific substance exchange activities in many regards have decided advantages over the conventional pellet bed and honeycomb catalysts. Thus already in this type of shaped waste gas lines a high degree of conversion of toxic material can be attained so that additional pellet bed or honeycomb arrangements can be omitted or their measurements reduced considerably. The body of the structural reinforcer can be made of ferrous work material customary for waste gas lines and in any thickness. It can be provided before or after the desired shaping by means of customary metal working processes such as forging, drawing casting, etc., completely or partially with the aluminum coating which is to be subsequently tempered.

An especially important property of the waste gas lines (in the broadest sense) formed as composite catalysts rests on the distribution of the heat formed in the combustion of the toxic material on a considerably expanded area lengthwise whereby there is avoided local overheating which can occur with all the injurious results, e.g., igniting disturbances in pellet beds or honeycomb catalysts. The new shaped catalyst also is suited for protection of conventional catalytic waste gas purification plants before overheating. For this purpose the waste gas line or exhaust system is simply built as a composite catalyst according to the present invention. Furthermore, the shaped catalyst can be used as heat producing preliminary apparatus to bring an after-connected main catalyst in the shortest time up to complete activity (ignition catalyst).

The invention further concerns a process for production of a shaped catalyst which is characterized in that a composite material of aluminum coated iron or steel is formed into the bodies provided as structural reinforcers, and this is tempered at least one minute at temperatures between 600° and 1200° C. A coating of the heat resistant carrier material is applied to the surface provided with an aluminum/iron diffusion layer, which carrier material already is provided with the catalytically active compounds or subsequently is provided with these. Preferably there is used for the structural reinforcing agent steel or cast iron with a carbon content between 0.05 and 5, preferably between 0.08 and 0.05 weight percent.

As starting material there can be used a composite work material, a substance whose aluminum layer is produced in a dipping process, by slab rolling, particularly hot slabs, aluminum plating, alitizing or calorizing. These processes are described in appropriate handbooks of the metal arts well known to those skilled in the art.

The aluminum layer can cover the structurally reinforcing body entirely or partially or on one, several or all sides. Preferably the aluminum layer of the starting-bonding material used for the structural reinforcer has a thickness of at least 10, preferably 20–150, particularly 40–60μ.

Essential for the formation of an ignition resistant, adhesive and anchoring enhancing aluminum/iron diffusion layer which also supplies sufficient corrosion protection are the temperature conditions which act on the composite work material. It has been found suitable for this to temper at a temperature in the range of 800°–900° C. for 7 to 30 minutes. A particularly desirable surface structure is obtained by tempering for 15 minutes at 870° C. Tempering in air has proven advantageous.

The application of the catalyst carrier takes place according to known coating processes. For this purpose, there is deposited on the surface of the tempered structural reinforcer support a heat resistant, porous carrier material or relatively high specific surface area. This is brought about by contacting the reinforcer support with an aqueous dispersion of the carrier material or with the solution of a salt which can be converted thermally into the carrier material and after removal of excess dispersion or solution and subsequent drying calcined at temperatures above 450° C. This process in a given case can be practiced repeatedly. Basically, all the customary heat resistant carrier materials for catalysts can be used. Thus the surface of the tempered, structural reinforcer support can be brought into contact with an aqueous dispersion of at least one compound of the group of oxides of Mg, Ca, Sr, Ba, Al, Sc, Y, the lanthanides, the actinides, Ga, In, Tl, Si, Ti, Zr, Hf, Th, Ge, Sn, Pb, V, Nb, Ta, Cr, Mo, W as well as the carbides, borides and silicides of the transition metals. Preferably such heat resistant carrier materials are added which synergistically promote the activity of the true catalytically active components. Examples thereof are simple or combined oxides such as active $Al_2O_3$, $ZrO_2$, $Ce_2O_3$, $CeO_2$, $SiO_2$, $TiO_2$ or silicates such as barium, boron or aluminosilicates or titanates such as barium or aluminum titanate or barium silicate.

In practice as heat resistant carrier materials there are particularly used the various phases of activated alumina which are commonly designated as activated alumina of the gamma series ($\gamma$-, $\eta$-, $\delta$-, $\theta$- or $\zeta$-, $\chi$- and x- $Al_2O_3$). These aluminum oxides can be combined or doped with specific elements which stabilize the crystal structure or increase the oxygen uptake of the total catalyst. According to a preferred form of the process of the invention, the surface of the tempered structural reinforcer support is brought into contact with an aqueous dispersion of aluminum oxide of the gamma series or its hydroxide or oxyhydrate precursor, which dispersion in a given case contains one or more salts of elements of the II, III and IV primary and secondary groups of the periodic system, e.g., barium nitrate, calcium chloride, cerium III or IV chloride, cerium IV nitrate, zirconium IV nitrate, zinc chloride, aluminum chloride, titanium IV chloride. However, there can also be applied to the reinforcer via a dispersion any other synergistically active compound, in contrast to the catalytically active compound or compound precursor.

A doping of aluminum oxide of the gamma series with the elements cerium and/or zirconium has a favorable effect on the durability of catalyst activity and moreover yields advantages in a simultaneously carried out oxidation or reduction of the noxious materials from internal combustion engines in a single catalyst bed. It has proven suitable for introducing these doping elements into the aluminum oxide lattice to produce an aluminum hydroxide or oxyhydrate precursor containing one of the elements cerium and/or zirconium by coprecipitation from a solution containing a cerium salt, zirconium salt, and in a given case also still containing an aluminum salt, e.g., aluminum chloride and then to calcine this precursor to the gamma-aluminum oxide-cerium, zirconium oxide matrix. Alternatively, there can be applied a calcined $Al_2O_3$ of the gamma-series, which contains $Ce_2O_3$ or $CeO_2$ and/or $ZrO_2$ or salts of the 3 or 4 valence cerium and/or the zirconium and either before or after applying the catalytically active components and thereafter calcined at a temperature of 500°–900° C. Preferably, this calcination takes place before applying the catalytically active components. For preparation of the dispersion of the heat resistant carrier material there are used techniques known in the art such as grinding processes, addition of anti-sedimentation assistants, such as polyethyleneimine and ammonium salts of polymeric carboxylic acids stabilized over the pH value (German AS No. 2,531,769) and aging processes.

The deposition of the catalytically active components can take place according to known processes for the production of catalyst carriers. Thus, the carrier layer can, for example, be impregnated with a melt of the active components. In many cases there takes place an impregnation, in a given case in the hot condition, with the concentrated aqueous salt solution of the active components and calcination after drying.

It is also possible to undertake a vapor phase impregnation in which a hot gas stream laden with sublimable catalytically active components, e.g., a butane gas stream, is led over the catalyst layer and the active components are precipitated on this. Furthermore, it is known to dissolve platinum salts or complexes in methanol, acetone, methyl acetate or similar solvents, to impregnate the catalyst carrier with this solution and to ignite whereby a reduction to platinum takes place. According to another known process platinum salts are dissolved in high boiling organic oils, the solution then applied to the carrier layer and the oil subsequently removed by heating which ignites the oil.

For the preparation of the shaped catalysts of the invention, particularly for the formation of the boundary of the reaction space it has proved desirable to impregnate the working area of the exhaust gas purification catalyst with a wash coat of heat resistant carrier material with a solution of a salt of a metal of the platinum group and/or of metals of the group Al, Cr, Mn, Co, Ni, Ti, Mg, Mo, W, Fe, V, Th, U, Cu, Ag, Zn, Cd, Hg, In, Tl, Bi, Sn, Pb, Sb, the lanthanides and the actinides, to dry and to calcine. Thus there can be used the chloride, e.g., palladous chloride, aluminum chloride, etc. Using carrier materials with high porosity, an impregnation process has proven particularly desirable in which the carrier material is first impregnated with an organic or inorganic liquid, optionally containing a solution of complexing, precipitating, and/or reducing agent wherein the saturation of the carrier material is not exceeded, then the solution of catalytically active element compounds added, the liquid removed by heating or burning off and, optionally, still further posttreatment carried out by reduction or tempering at elevated temperature. In this way there is avoided a depositing of active material in deep zones of the pores, whereby a considerable saving results (German OS No. 2,531,770).

A catalyst carrier tested in the catalytic purification of the exhaust gases from motor vehicles engines which can be operated both according to the oxidation process as well as according to the so-called 3-way process is particularly well suited for the production of shaped catalysts according to the invention. Herewith a wash coat of heat resistant carrier material is impregnated with a solution of salts, especially chlorides of the platinum group elements Ru, Rh, Pd and Pt and the nonmoble metals Al, Ti, Cr, Mn, Co, Ni, where a total of at least three different metals are chosen of which at least one is present from each type of metal and the atomic ratio of platinum group metal to non-noble metal is from 1:4 to 1:1, then the impregnated carrier is dried and subsequently treated at temperatures above 450° C. in a hydrogen containing gas. There is formed thereby an intermetallic system capable of many functions and of high conversion activity. Illustrative of suitable chlorides are palladous chloride, hexachloroplatinic acid, rhodium trichloride, ruthenium tetrachloride, aluminum chloride, titanium tetrachloride, chromic chloride, manganous chloride, cobaltic chloride, nickelous chloride.

Further improvements are obtained if a wash coat of heat resistant carrier material is impregnated with an aqueous or alcoholic solution of a salt of the platinum group metals Pt and Rh and at least one salt of the non-noble metals Al, Ti, Cr, Mn, Co, Ni in an atomic ratio of the platinum group metal to the nonnoble metal between 1:4.0 to 1:2.40 and after drying at calcining temperatures of 450° to 1000° C., preferably 500°–900° C., particularly 700°–850° C. reducingly heated or the salt thermolyzed using an alcoholic solution by burning off the alcohol. The atomic ratio between Pt and Rh is held therewith generally in the range between 2:1 and 20:1. The salts can be the same as those mentioned above, for example.

It has long been known to treat catalyst carriers of aluminum oxide with a solution of spinel forming heavy metals, then at temperatures above 600° C. undertake formation of a spinel and subsequently to apply the true catalytically active substance with solutions of salts of the same or other spinel formers, whereupon it is separately calcined at temperatures above 300° C. This process may also be used with advantage with catalysts formed according to the invention if, for example, a wash coat of aluminum oxide of the gamma series is impregnated with the solution of a spinel forming heavy metal, preferably in stoichiometric proportion, dried, then heated to 600°–1200° C. to form the spinel and subsequently impregnated with the solution of a salt of one or more of the metals Fe, Co, Ni, Mn, Cu, Mg, whereupon the impregnated product is subsequently calcined at temperatures above 300° C. Thus there can be used the chlorides such as those mentioned above as well as ferric chloride, ferrous chloride, cupric chloride, magnesium chloride.

Another type of catalyst in which an aluminate of non-noble metals is present is likewise an advantageous catalytically active component for the shaped catalysts of the invention. Illustratively, for its preparation, a wash coat of aluminum oxide is annealed 2 to 40 hours at 500°–900° C. The intermediate product after cooling is impregnated with a solution of a salt of one of the elements copper, manganese, cobalt and nickel, the salt decomposed at 400° C. and subsequently annealed again for 2 to 40 hours at 500° to 900° C.

Finally a further object of the invention is the use of the described shaped catalysts for purification of the exhaust gases from internal combustion engines and industrial plants.

Figure 1:
FIG. 1 is a scanning electron microscope photograph of the surface of the untempered precursor of the structural reinforcer used in the invention (starting material carbon steel ST 34 with 0.12% C., aluminum plated in a layer thickness of 60μ by melt dipping, rolling and inductive welding) enlarged 300 times.
Figure 2:
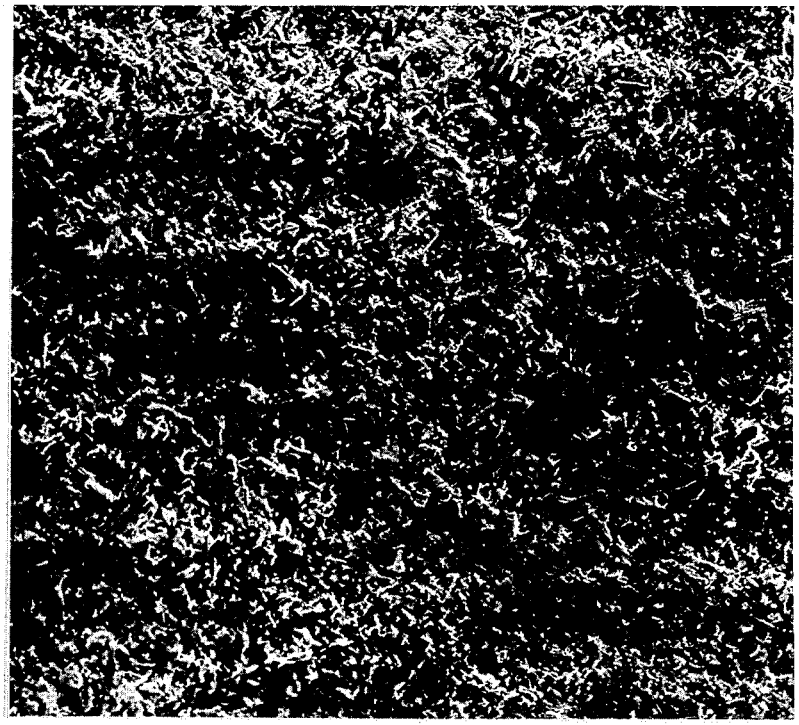
FIG. 2 is a scanning electron microscope photograph of the surface of the structural reinforcer used in the invention (tempered 15 minutes at 870° C. in air) enlarged 100 times.
Figure 3:
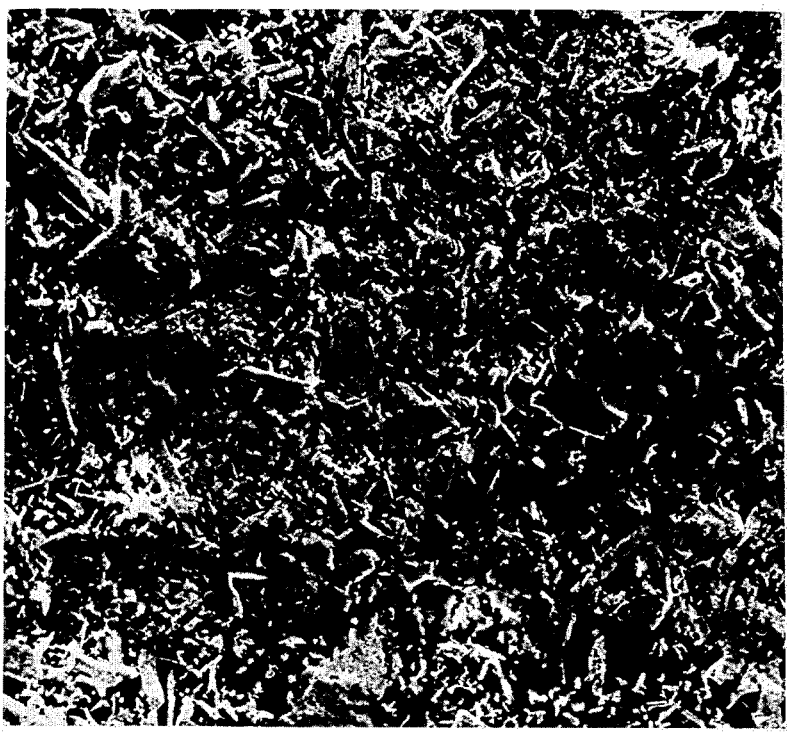
FIG. 3 is a scanning electron microscope photograph of the surface of the structural reinforcer shown in FIG. 2 enlarged 300 times.
Figure 4:
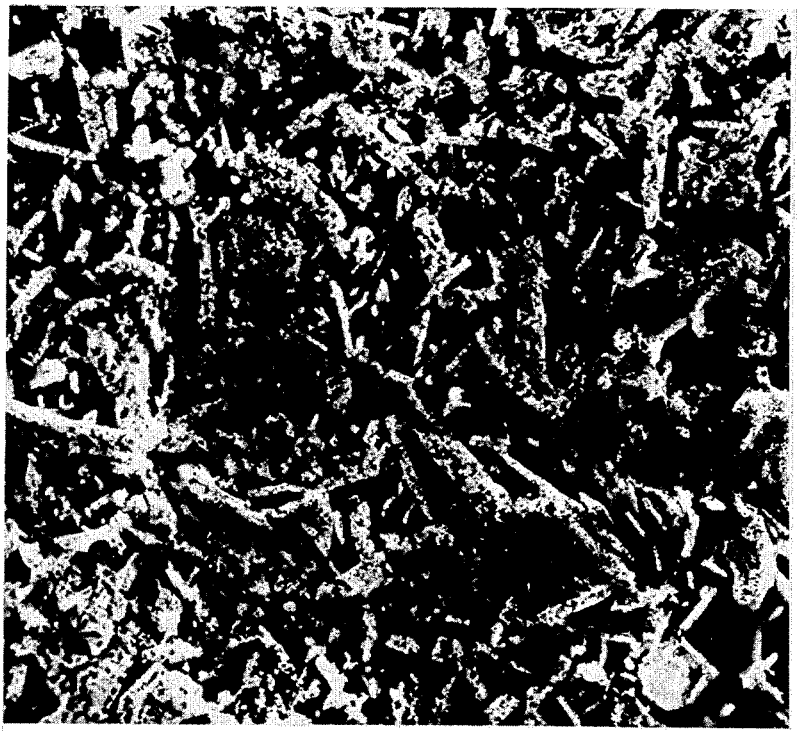
FIG. 4 is a scanning electron microscope photograph of the surface of the structural reinforcer shown in FIG. 2 enlarged 1000 times.

From the figures of the drawings, it can be seen that the starting material tempered for 15 minutes at 870° C. in air has a predominantly uniformly fissured, anchoring favoring surface as well as strong, irregular matting of the alloy crystals.

The catalysts of the invention can comprise, consist essentially of or consist of the materials set forth.

Unless otherwise indicated all parts are by weight.

The invention will be further illustrated in the following examples.

DESCRIPTION OF THE PREFERRED EMBODIMENTS

From the following d-value tables of the X-ray fine structure analysis of a diffusion layer obtained according to the invention there is shown the composition of the diffusion layer is Fe and FeAl.

TABLE

| Intensity | d-value | Comparison* |
|---|---|---|
| st | 2.90 | 2.89–12 |
| stst | 2.05 | 2.04–100 |
| s | 1.68 | 1.67–4 |
| st | 1.45 | 1.45–8 |

*ASTM 1-1257 for AlFe
Absorption conditions: CrKd/V-irradiation
30 KV, 10 m A, 3h

EXAMPLE 1

A round pipe having multiple bends therein and plated on both sides with a 60μ thick aluminum layer by melt dipping and rolling and having 4-connecting drilled installations of unalloyed carbon steel St. 45.8, having an inner diameter of 40 mm, an outer diameter of 43 mm and a length of 1000 mm, after defatting was tempered in air in a tempering furnace at 850° C. for 10 minutes. The thus prepared, shaped catalyst was subsequently rinsed with a 30% aqueous dispersion of gamma aluminum oxide and thereby coated with 45 grams of $Al_2O_3$.

In connection therewith there followed drying at 120° C. and then a 1 hour tempering at 500° C. Next the exhaust pipe thus coated with the heat resistant carrier material was treated with an aqueous solution of aluminum ceric nitrate and zirconium nitrate so that after drying and tempering at 500° C. for 60 minutes there remained 0.8 gram of ceric oxide and 1.5 grams of zirconium oxide in the $Al_2O_3$ coating. Then the pipe was rinsed with an aqueous solution of hexachloroplatinic acid and rhodium trichloride (weight ratio Pt:Rh=8.5:1) and dried. The Pt content amounted to 0.8945 gram and the rhodium content 0.1055 gram. Subsequently, the reduction of noble metal salts deposited on the washcoat took place in a hydrogen stream at a temperature of from 500° C. (1 hour).

The thus prepared shaped catalyst was tested on the engine test stand in the fresh condition and subsequently underwent over 250 hours in a duration test using exhaust gas at a temperature of 680° to 750° C. (lead free gasoline used). Subsequently, it was again examined as to its activity. After this severe test it showed no inner or outer corrosion or any damage. Separation of the active layer did not occur. The activity of the coating was somewhat reduced to about the level usually occurring with noble catalysts over the test time employed.

| Test Conditions | |
|---|---|
| Space velocity | 80,000 h$^{-1}$ |
| Exhaust gas temperature | 300 to 690° C. |
| Exhaust gas composition | |
| CO | 0.5 vol. % |
| HC | 150 ppm' |
| $NO_x$ | 1800 ppm |
| $CO_2$ | 14.9 vol. % |
| $O_2$ | 1.0 vol. % |
| Residue: nitrogen and steam. | |

| Activity in the Fresh Test | | | |
|---|---|---|---|
| $\lambda = 1.03$ | Conversion at 500° C. exhaust temperature at | | |
| | CO (%) | HC (%) | $NO_x$ (%) |
| | 65 | 53 | 10.6 |
| | Activity After Aging | | |
| and $\lambda = 1.03$ | Conversion at 690° C. exhaust gas temperature | | |
| | After 250 hours engine test (Ottomotor, 1.6 l) | | |
| | CO (%) | HC (%) | $NO_x$ (%) |
| | 40 | 42 | 2.6 |

EXAMPLE 2

A straight exhaust pipe prepared as in Example 1 as a shaped catalyst, which, however in place of the noble metal coating had a coating of 120 grams of nonnoble metal components (weight ratio copper-chromium oxide:γ-aluminum oxide:nickel oxide:zirconium oxide=70:30:8:10) was likewise subjected to a durability test of over 250 hours whereby, however, lead containing motor fuel was used. The lead content was 0.17 gram/liter. The test conditions and aging conditions corresponded to those of Example 1.

| Activity in the Fresh Test | | | |
|---|---|---|---|
| and $\lambda = 1.03$ | Conversion at 500° C. exhaust gas temperature | | |
| | CO (%) | HC (%) | $NO_x$ (%) |
| | 25 | 39 | 5.6 |
| | Activity After Aging | | |
| and $\lambda = 1.03$ | Conversion at 690° C. waste gas temperature after 250 hours engine test (Ottomotor, | | |

-continued

Activity in the Fresh Test
1.6 l)

| | CO (%) | HC (%) | NO$_x$ (%) |
|---|---|---|---|
| | 13 | 20 | 2.5 |

The shaped catalyst showed no corrosion damage, the coating likewise was still in order.

EXAMPLE 3

A straight exhaust pipe was used having a length of 1000 mm, an inner diameter of 40 mm, 43 outer diameter and consisting of ST-34 material, a 0.12% carbon steel, which was aluminum plated on both sides by a heating process and had an aluminum layer thickness of 40–60μ. The aluminum plating was carried out by dipping a black-pickeled steel ribbon in melted aluminum and subsequent rolling. The plated ribbon was then shaped into a pipe and welded by induction. The pipe was equipped internally with a 6-bladed twisted body which had a twist of 360° C. in a length of 1 meter. The material of the twisted body like the pipe was ST-34 steel plated with aluminum. The twisted body at its ends was welded to the pipe.

The pipe provided with the installations was then treated thermally for 15 minutes increasingly in the region of 870–900° C. in a muffle furnace in air. The pipe was laid in the already heated furnace for this purpose. Thereby the melting aluminum at this temperature began to diffuse into the iron whereby it formed a rough surface, corrosion resistant, non-scaling and firmly adhesive iron rich aluminum-iron alloy. This showed in the Debye-Scherrer photograph only interferences of iron and aluminum-iron. Oxides of these metals could not be ascertained on the surface.

After the annealing treatment the pipe was coated with a 30% aluminum oxide dispersion. For this purpose a tempered γ-aluminum oxide was slurried in water, dispersed and treated with Polymin ® P additive (polyethyleneimine) as stabilizer. The particle size distribution in the tempered aluminum oxide was

| >100μ | 10% |
|---|---|
| >50μ | 35% |
| >10μ | 80%. |

The pipe was rinsed twice with this washcoat, blown out with air and dried. There were deposited 50 grams of γ-Al$_2$O$_3$.

The thus coated pipe was tempered in the muffle furnace for 1 hour at 500° C. in air. The pipe was then rinsed with a cerium and zirconium salt containing solution. The solution contained 133 grams of ammonium ceric nitrate and 185 ml of zirconium nitrate solution (with 20% ZrO$_2$) per liter. There were required 60 ml of solution for the impregnation which corresponds to a content of 2.5 grams CeO$_2$ and 3.3 grams ZrO$_2$.

After drying the product was again tempered for 1 hour at 500° C. in air to decompose the nitrate.

For the coating there was used 1 gram of noble metal (0.8945 gram Pt and 0.1055 gram Rh, which corresponds to a weight ratio between Pt and Rh of 8.5:1) and 5 grams of aluminum acetyl acetonate in 120 ml of methanolic solution.

There were added 3.578 grams of H$_2$PtCl$_6$ solution containing 25% Pt and 0.639 grams of RhCl$_3$ solution containing 16.4% Rh. The pipe interior coated with the cerium and zirconium containing washcoat was twice impregnated with the solution and then each time the methanolic impregnation ignited and the methanol burned off. There took place a thermal decomposition in the muffle furnace at 600° C. which was accomplished in 10 minutes under flushing with N$_2$. A thus prepared pipe on the engine test stand showed the following catalytic activity:

The test and aging conditions correspond
to those of Example 1
Activity in the Fresh Test
Conversion at 500° C. exhaust gas temperature
and λ + 1.03

| CO (%) | HC (%) | NO$_x$ (%) |
|---|---|---|
| 70 | 43 | 5.4 |

Activity After Aging
Conversion at 690° C. Exhaust Gas Temperature and
λ = 1.03 After 250 Hours Engine Test (Ottomotor, 1.6 l)

| CO (%) | HC (%) | NO$_x$ (%) |
|---|---|---|
| 43 | 31 | 4.3 |

The shaped catalyst exhaust pipe showed no appearance of corrosion or damage to the coating.

What is claimed is:

1. A shaped catalyst consisting essentially of a structural reinforcing agent of ferrous metal, a layer of a heat-resistant carrier material on the structural reinforcing agent, a catalytically active component on the carrier material; the body of the structural reinforcing agent consisting essentially of iron or steel and having its surface provided with a non-scaling, adhesive and anchoring-favoring aluminum/iron diffusion layer, said diffusion layer having been obtained by tempering an aluminum-coated iron or steel at a temperature between 600 and 1200° C. for at least 1 minute.

2. A shaped catalyst according to claim 1 wherein the body of the structural reinforcing agent is made of steel or cast iron having a carbon content between 0.005 and 5 weight percent.

3. A shaped catalyst according to claim 2 wherein the carbon content is between 0.08 and 0.5 weight percent.

4. A shaped catalyst according to claim 2 wherein the body of the structural reinforcing agent is provided with an iron rich aluminum/iron diffusion layer.

5. A shaped catalyst according to claim 4 wherein the diffusion layer has at most a very slight content of Al$_3$Fe.

6. A shaped catalyst according to claim 4 wherein the diffusion layer has a roughness above 0.05μ measured on the Hommel depth of roughness measuring device T3.

7. A shaped catalyst according to claim 2 wherein the body of the structural reinforcing agent is at least partially coated with a combination of carrier material and catalytically active component.

8. A shaped catalyst according to claim 7 wherein the body of the structural reinforcing agent is only partially coated with the combination of carrier material and catalytically active component.

9. A shaped catalyst according to claim 7 wherein the body of the structural reinforcing agent is completely coated with the combination of carrier material and catalytically active component.

10. A shaped catalyst according to claim 7 which is in honeycomb shape and at least the honeycomb channels are coated with the combination of carrier material and catalytically active component.

11. A shaped catalyst according to claim 1 which defines a reaction chamber.

12. A shaped catalyst according to claim 7 which defined a reaction chamber.

13. A shaped catalyst according to claim 1 wherein said combination of carrier material and catalytically active component surface form the combustion chamber and exhaust gas channels of an internal combustion engine.

14. A shaped catalyst according to claim 1 which is in the form of a pipe or a pipe system and the inner walls of said pipe or plurality of pipes is coated with the combination of carrier material and catalytically active component.

15. A shaped catalyst according to claim 14 wherein said pipe or pipe system is an exhaust pipe, waste pipe, waste collection line, preliminary muffler or main muffler of a motor vehicle equipped with an internal combustion engine.

16. A shaped catalyst according to claim 15 which is in the form of flow disturbing or direction changing bodies coated on all sides with the combination of carrier material and catalytically active component.

17. A process for the production of the shaped catalyst of claim 1 comprising forming a composite work material of aluminum coated iron or steel to the ferrous structural reinforcing agent, tempering the thus formed combination for at least 1 minute at a temperature of 600 to 1200° C., applying a coating of a heat-resistant carrier to the surface provided with an aluminum/iron diffusion layer and providing said carrier with a catalytically active component.

18. A process according to claim 17 wherein the carrier is one provided with a catalytically active component prior to the carrier being applied to said diffusion layer.

19. A process according to claim 17 including the step of applying a catalytically active component to the carrier after the carrier is applied to the diffusion layer.

20. A process according to claim 17 wherein the structural reinforcing agent is made of steel or cast iron having a carbon content of 0.05 to 5 weight percent.

21. A process according to claim 20 wherein there is employed a composite work material whose aluminum layer is produced by a dipping process or roll plating.

22. A process according to claim 20 wherein there is employed a composite work material whose aluminum layer is produced by heat plating, alumetizing, alitizing or calorizing.

23. A process according to claim 20 wherein the body of the structural reinforcing agent is at least partially coated with the aluminum layer.

24. A process according to claim 23 wherein the body of the structural reinforcing agent is only partially covered with the aluminum layer.

25. A process according to claim 23 wherein the body of the structural reinforcing agent is completely coated with the aluminum layer.

26. A process according to claim 23 wherein the aluminum layer has a thickness of at least 10μ.

27. A process according to claim 26 wherein the aluminum layer has a thickness of 20-150μ.

28. A process according to claim 27 wherein the aluminum layer has a thickness of 40-60μ.

29. A process according to claim 28 wherein tempering is for 15 minutes at 870° C. in air.

30. A process according to claim 28 wherein the tempering is for 7-30 minutes at 800°-900° C.

31. A process according to claim 27 wherein the tempering is for 7-30 minutes at 800°-900° C.

32. A process according to claim 26 wherein the tempering is for 7-30 minutes at 800°-900° C.

33. A process according to claim 26 wherein the tempering is in air.

34. A process according to claim 20 comprising contacting the surface of the tempered structural reinforcing agent with the heat-resistant carrier material in the form of an aqueous dispersion of the carrier material or in the form of a solution of a salt which is thermally convertible to the carrier material, removing excess dispersion or solution, drying and calcining at a temperature above 450° C.

35. A process according to claim 34 wherein the surface of the tempered structural reinforcing agent is contacted with an aqueous dispersion of at least one oxide of Mg, Ca, Sr, Ba, Al, Sc, Y, a lanthanide, an actinide, Ga, In, Tl, Si, Ti, Zr, Hf, Th, Ge, Sn, Pb, V, Nb, Ta, Cr, Mo, W or a carbide, boride or silicide of a transition metal.

36. A process according to claim 35 wherein the surface of the tempered structural reinforcing agent is contacted with an aqueous dispersion of aluminum oxide of the gamma series or of its hydroxide or oxide hydrate precursor.

37. A process according to claim 36 wherein the dispersion includes a salt of an element of Group II, III or IV of the periodic system.

38. A process according to claim 37 wherein the salt is a chloride or nitrate.

39. A process according to claim 37 including the preliminary step of forming cerium and zirconium or a mixture of cerium and zirconium containing aluminum hydroxide or oxide hydrate precursor by coprecipitating a cerium salt, a zirconium salt or a mixture of a cerium salt and a zirconium salt from a solution thereof with the aluminum hydroxide or oxide hydrate.

40. A process according to claim 36 wherein there is applied as the carrier a calcined $Al_2O_3$ of the gamma series which contains $Ce_2O_3$, $CeO_2$, $ZrO_2$ or a mixture of $Ce_2O_3$ or $CeO_2$ with $ZrO_2$ or a salt of trivalent or tetravalent cerium or zirconium or a mixture of such salts and the product is calcined at a temperature of 500°-900° C. either before or after applying the catalytically active component.

41. A process according to claim 34 wherein the dispersion includes an antisedimentation aid.

42. A process according to claim 34 comprising applying a washcoat of a heat-resistant carrier material impregnated with a solution of a salt of at least one metal of the platinum group and/or Al, Cr, Mn, Co, Ni, Ti, Mg, Mo, W, Fe, V, Th, U, Cu, Ag, Zn, Cd, Hg, In, Tl, Bi, Sn, Pb, Sb, the lanthanides or the actinides, drying and calcining.

43. A process according to claim 42 wherein the washcoat of heat-resistant carrier material is impregnated with a solution of a salt of at least one platinum group element from Ru, Rh, Pd, and Pt and at least one non-noble metal from Al, Ti, Cr, Mn, Co and Ni, there being employed the salts of at least three different metals, there being employed at least one platinum group metal salt and one non-noble metal salt and wherein the atomic ratio between platinum group metal and non-noble metal is between 1:4 and 1:1, and the process includes drying the washcoat and subsequently treating at a temperature above 450° C. in a hydrogen gas containing atmosphere.

44. The process according to claim 43 wherein the salts are chlorides.

45. A process according to claim 42 wherein the washcoat of heat-resistant carrier material is impregnated with an aqueous or alcoholic solution of a salt of the platinum group metal Pt or Rh and at least one salt of the non-noble metals Al, Ti, Cr, Mn, Co and Ni in an atomic ratio of platinum group metal to non-noble metal between 1:4.0 and 1:2.40 and drying and calcining at 450°–1000° C.

46. A process according to claim 45 wherein the calcining is at 500°–900° C.

47. A process according to claim 46 wherein the calcining is at 700°–850° C.

48. A process according to claim 45 comprising reductively heating after the calcining.

49. The process according to claim 45 wherein an alcoholic solution of the salts is employed and thermolysis is carried out by burning off the alcohol.

50. A process according to claim 20 comprising applying a washcoat of aluminum oxide of the gamma series impregnated with a spinel forming heavy metal, drying, heating to 600°–1200° C. to form the spinel and subsequently impregnating with a solution of a salt of the metals Fe, Co, Ni, Mn, Cu and Mg and subsequently calcining at a temperature above 300° C.

51. A process according to claim 20 comprising applying a washcoat of aluminum oxide, annealing for 2–40 hours at 500°–900° C., cooling, impregnating the intermediate product with the solution of a salt of Cu, Mn, Co or Ni, decomposing the salt at a temperature of 400° C. and subsequently again annealing for 2–40 hours at 500° to 900° C.

* * * * *